US012726257B2

(12) United States Patent
Elia et al.

(10) Patent No.: US 12,726,257 B2
(45) Date of Patent: Sep. 1, 2026

(54) ELECTRONIC DEVICE COMPRISING A METASURFACE

(71) Applicant: TELECOM ITALIA S.p.A., Milan (IT)

(72) Inventors: Gabriele Elia, Turin (IT); Antonio Manzalini, Turin (IT); Paolo Snidero, Latina (IT)

(73) Assignee: TELECOM ITALIA S.p.A., Milan (IT)

( * ) Notice: Subject to any disclaimer, the term of this patent is extended or adjusted under 35 U.S.C. 154(b) by 230 days.

(21) Appl. No.: 18/549,181

(22) PCT Filed: Feb. 18, 2022

(86) PCT No.: PCT/EP2022/054112

§ 371 (c)(1), (2) Date: Sep. 6, 2023

(87) PCT Pub. No.: WO2022/189125

PCT Pub. Date: Sep. 15, 2022

(65) Prior Publication Data

US 2024/0162971 A1 May 16, 2024

(30) Foreign Application Priority Data

Mar. 12, 2021 (IT) ........................ 102021000005987

(51) Int. Cl.

*H04B 7/08* (2006.01)
*H01Q 1/24* (2006.01)
(Continued)

(52) U.S. Cl.

CPC ........... *H04B 7/0874* (2013.01); *H01Q 1/243* (2013.01); *H01Q 3/46* (2013.01); *H01Q 15/0086* (2013.01); *H04B 7/0691* (2013.01)

(58) Field of Classification Search

CPC ...... H04B 7/0874; H04B 7/0691; H04B 7/08; H01Q 1/243; H01Q 3/46; H01Q 15/0086;
(Continued)

(56) References Cited

U.S. PATENT DOCUMENTS

| | | | |
|---|---|---|---|
| 10,727,601 B1 | 7/2020 | Akselrod et al. | |
| 2017/0069967 A1 | 3/2017 | Shrekenhamer | |
| 2021/0036753 A1* | 2/2021 | Lee | H01Q 21/28 |

OTHER PUBLICATIONS

Lili Chen et al: "Pushing the Physical Limits of IoT Devices with Programmable Metasurfaces", arxiv.org, Cornell University Library, 201 Olin Library Cornell University Ithaca, NY 14853, Oct. 8, 2020 (Oct. 8, 2020), XP081780135, (Year: 2020).*

(Continued)

*Primary Examiner* — Michael A Faragalla
(74) *Attorney, Agent, or Firm* — Oblon, McClelland, Maier & Neustadt, L.L.P.

(57) ABSTRACT

An electronic device includes a metasurface for intercepting electromagnetic radiation, the metasurface comprising a plurality of active elements for sensing at least one parameter of the electromagnetic radiation as it is actually received at the electronic device, wherein the active elements of said plurality of active elements are controllable to implement a plurality of configurations of the metasurface each one corresponding to a radiation pattern with which the electromagnetic radiation is passed through the metasurface, a control unit communicably coupled to the metasurface, wherein the control unit is configured to iteratively: receive the sensed at least one parameter from the metasurface; identify, based on the at least one parameter of the electromagnetic radiation, an optimized configuration, among the plurality of configurations, that optimizes electromagnetic radiation reception at the electronic device, and control the active elements to implement the optimized configuration.

13 Claims, 5 Drawing Sheets

Figure 1A:
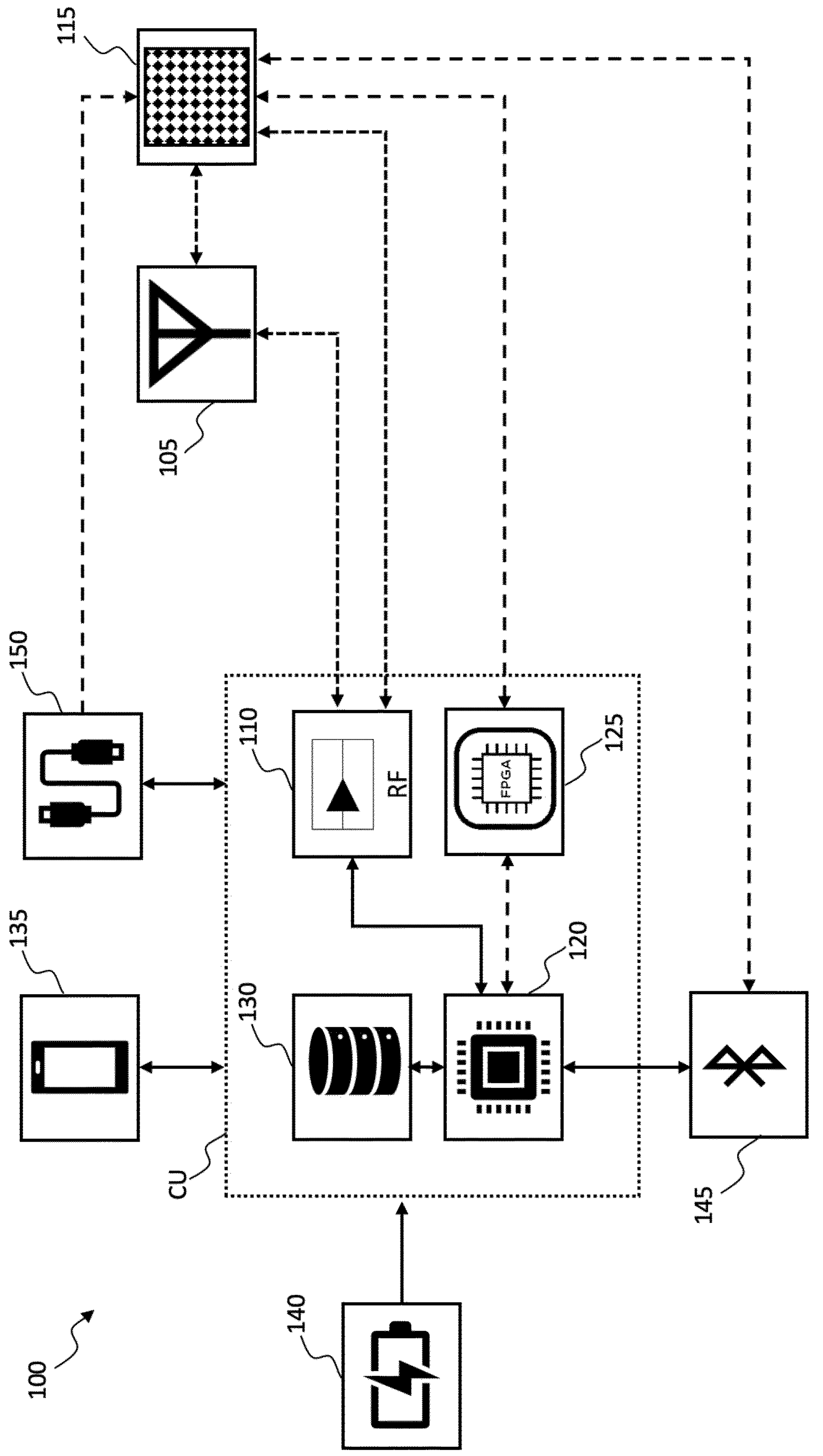

(51) Int. Cl.
*H01Q 3/46* (2006.01)
*H01Q 15/00* (2006.01)
*H04B 7/06* (2006.01)

(58) Field of Classification Search
CPC ..... H01Q 19/06; H01Q 21/06; H04W 12/033; H04W 12/102
See application file for complete search history.

(56) References Cited

OTHER PUBLICATIONS

International Search Report & Written Opinion issued May 9, 2022 in PCT/EP2022/054112, filed on Feb. 18, 2022, 17 pages.
Chen et al. "Pushing the Physical Limits of IoT Devices with Programmable Metasurfaces", arxiv.org, Cornell University Library, 2020, 14 pages.

* cited by examiner

ELECTRONIC DEVICE COMPRISING A METASURFACE

BACKGROUND OF THE INVENTION

Field of the Invention

The present invention generally relates to an electronic device. Particularly, the present invention relates to an electronic device configured to receive and process electromagnetic radiation (such as radio frequency signals). More particularly, the present invention relates to an electronic device featuring maximized reception of the electromagnetic radiation.

Overview of the Related Art

Electronic devices adapted to receive electromagnetic radiation, such as radio frequency (RF) signals from wireless communication systems are widely used.

Examples of such electronic devices comprise mobile phones, smartphones, tablets, personal digital assistants (PDAs), laptop computers, Internet of Things devices, and drones.

Examples of wireless communication systems comprise cellular communication systems (such as cellular communication systems based on UTRA ("UMTS Terrestrial Radio Access"), WCDMA ("Wideband Code Division Multiple Access"), CDMA2000, GERAN ("GSM EDGE Radio Access Network"), LTE ("Long Term Evolution"), LTE-Advanced, and 5G NR ("New Radio") radio access technologies) and WLAN (or Wi-Fi) communication systems.

In order to achieve RF signal exchange with the wireless communication systems, each electronic device typically comprises an antenna arrangement. The antenna arrangement may for example comprise a transmitting antenna (or more thereof) allowing the electronic device to transmit the RF signals, and a receiving antenna (or more thereof) allowing the electronic device to receive the RF signals.

SUMMARY OF INVENTION

The Applicant has found that the electronic devices known in the art are subject to inconstant, irregular and unpredictable RF signal reception.

Indeed, the Applicant has understood that RF signal reception at each electronic device strongly depends on the way a user holds it. Particularly, considering that the electronic devices having connection capabilities to the wireless communication systems are dynamically handled by the users, and particularly they are frequently and randomly (and, hence, unpredictably) moved/rotated by the users, the changes in the antenna inclination angles resulting from frequent and random movements/rotations of the electronic devices negatively affect RF signal reception.

Although some studies exist about statistical characteristics of the way the users use (i.e., handle or hold or move) their own user devices, no solutions exist that are based on channel models taking into account relationships between the (stochastic) antenna inclination angles and one or more parameters of the received RF signals.

In this respect, the Applicant has faced the above-mentioned issues, and has devised an electronic device (and a corresponding method) for maximizing reception of the electromagnetic radiation (such as RF signals) in almost every condition of use.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to an electronic device. The electronic device is adapted to receive and process an electromagnetic radiation, such as a radio frequency signal from a wireless communication system. The electronic device may comprise a metasurface for intercepting the electromagnetic radiation; the metasurface may comprise a plurality of active elements for sensing at least one parameter of the electromagnetic radiation as it is actually received at the electronic device; the active elements of said plurality of active elements may be controllable to implement a plurality of configurations of the metasurface each one corresponding to a radiation pattern with which the electromagnetic radiation is passed through the metasurface. The electronic device may comprise a control unit communicably coupled to the metasurface. The control unit may be configured to iteratively receive the sensed at least one parameter from the metasurface, identify, based on the at least one parameter of the electromagnetic radiation, an optimized configuration, among the plurality of configurations, that optimizes electromagnetic radiation reception at the electronic device, and control the active elements to implement the optimized configuration.

According to an embodiment, whose features are additional or alternative to any of the previous embodiments, the control unit is configured to identify the optimized configuration based on:

- a predefined configuration database comprising a plurality of optimized configurations as a function of the at least one parameter, or
- an artificial intelligence algorithm.

According to an embodiment, whose features are additional or alternative to any of the previous embodiments, the electronic device further comprises an antenna arrangement allowing the electronic device to receive the electromagnetic radiation. The optimized configuration implemented by the active elements may allow optimizing electromagnetic radiation reception at the antenna arrangement through the metasurface.

According to an embodiment, whose features are additional or alternative to any of the previous embodiments, the metasurface at least partially overlaps a reception surface of the antenna arrangement designed to receive the electromagnetic radiation.

According to an embodiment, whose features are additional or alternative to any of the previous embodiments, the metasurface acts as an antenna of the electronic device. The optimized configuration implemented by the active elements may allow optimizing electromagnetic radiation reception at the electronic device through the metasurface.

According to an embodiment, whose features are additional or alternative to any of the previous embodiments, the metasurface is external or internal to a case of the electronic device.

According to an embodiment, whose features are additional or alternative to any of the previous embodiments, the control unit comprises a programmable unit, such as Field-Programmable Gate Array unit, being programmable according to the optimized configuration.

According to an embodiment, whose features are additional or alternative to any of the previous embodiments, the at least one parameter of the electromagnetic radiation comprises at least one among spectrum, polarization and angle of incidence of the electromagnetic radiation.

According to an embodiment, whose features are additional or alternative to any of the previous embodiments, the active elements comprise one or more among field-effect transistors, micro-electro-mechanical systems, varactors and positive-intrinsic-negative diodes.

According to an embodiment, whose features are additional or alternative to any of the previous embodiments, the control unit is configured to control the active elements according to space-time coding, whereby the metasurface allows manipulation of the electromagnetic radiation in both space and frequency domains.

Another aspect of the present invention relates to a method for operating an electronic device. The electronic device is adapted to receive and process an electromagnetic radiation, such as a radio frequency signal from a wireless communication system. The electronic device may comprise a metasurface for intercepting the electromagnetic radiation. The metasurface may comprise a plurality of active elements for sensing at least one parameter of the electromagnetic radiation as it is actually received at the electronic device. The active elements of said plurality of active elements are controllable to implement a plurality of configurations of the metasurface each one corresponding to a radiation pattern with which the electromagnetic radiation is passed through the metasurface. The method may comprise iteratively:

- receiving the sensed at least one parameter from the metasurface;
- identifying, based on the at least one parameter of the electromagnetic radiation, an optimized configuration, among the plurality of configurations, that optimizes electromagnetic radiation reception at the electronic device, and controlling the active elements to implement the optimized configuration.

BRIEF DESCRIPTION OF THE ANNEXED DRAWINGS

Figure 1B:
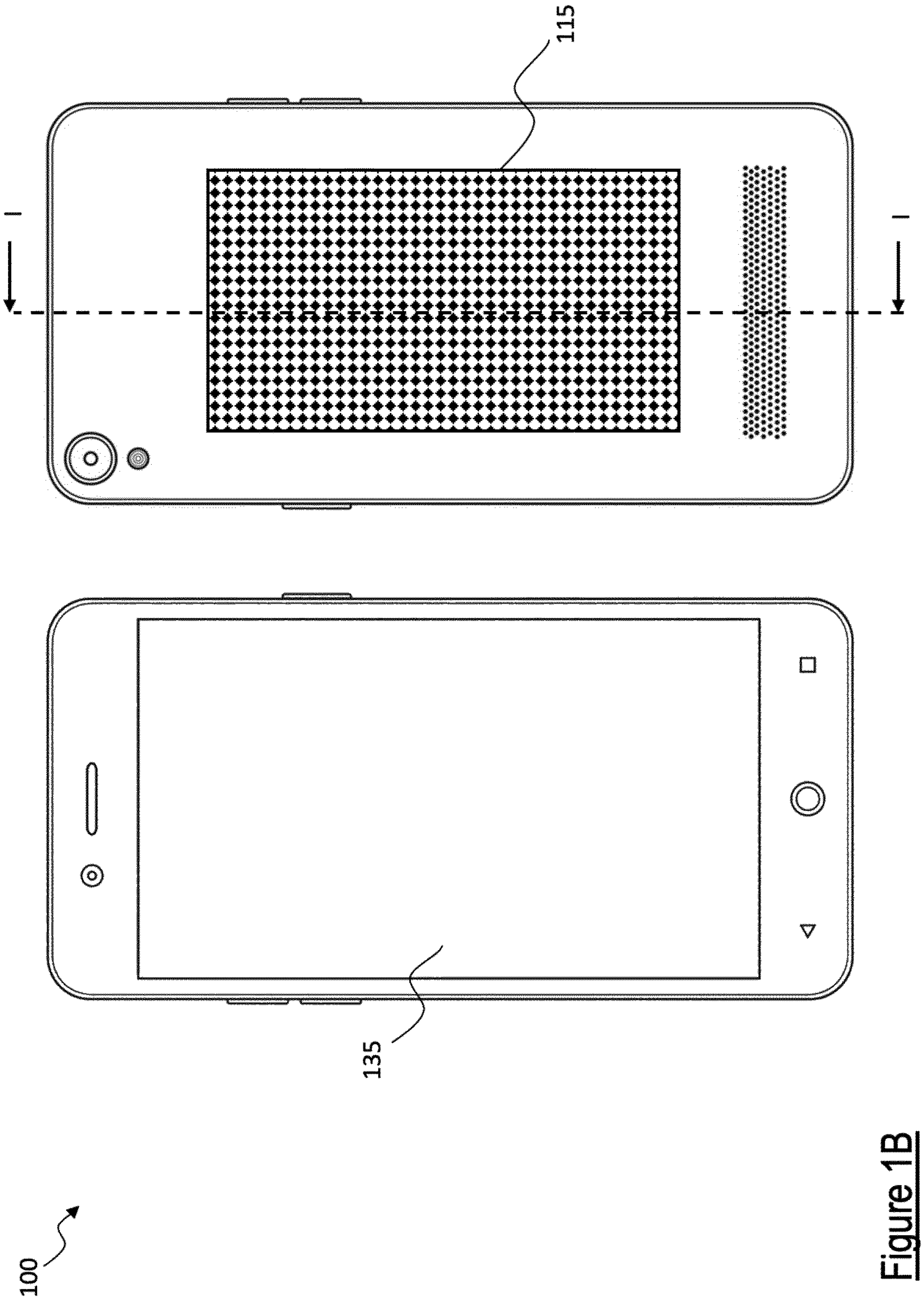
Figure 1C:
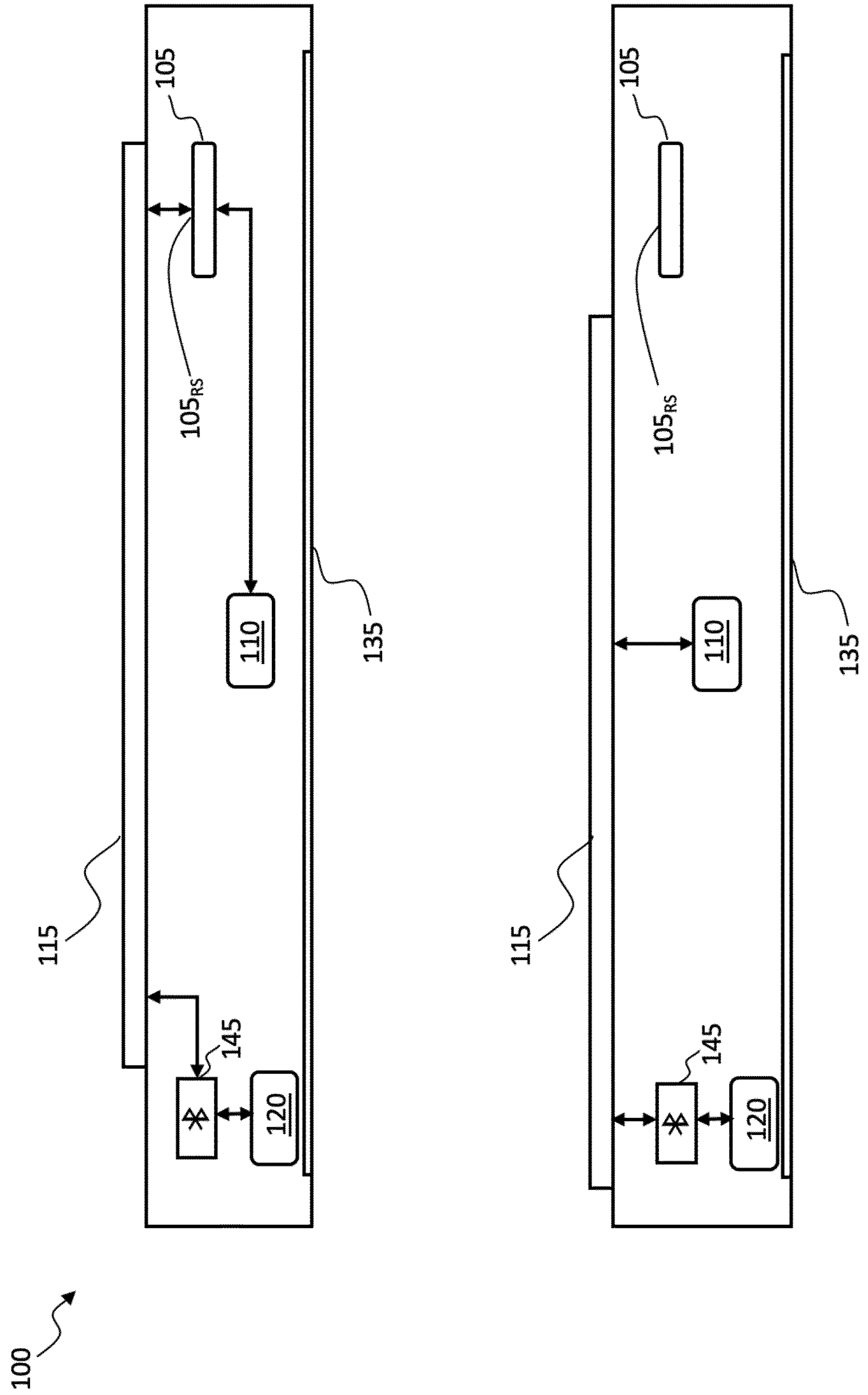
Figure 1D:
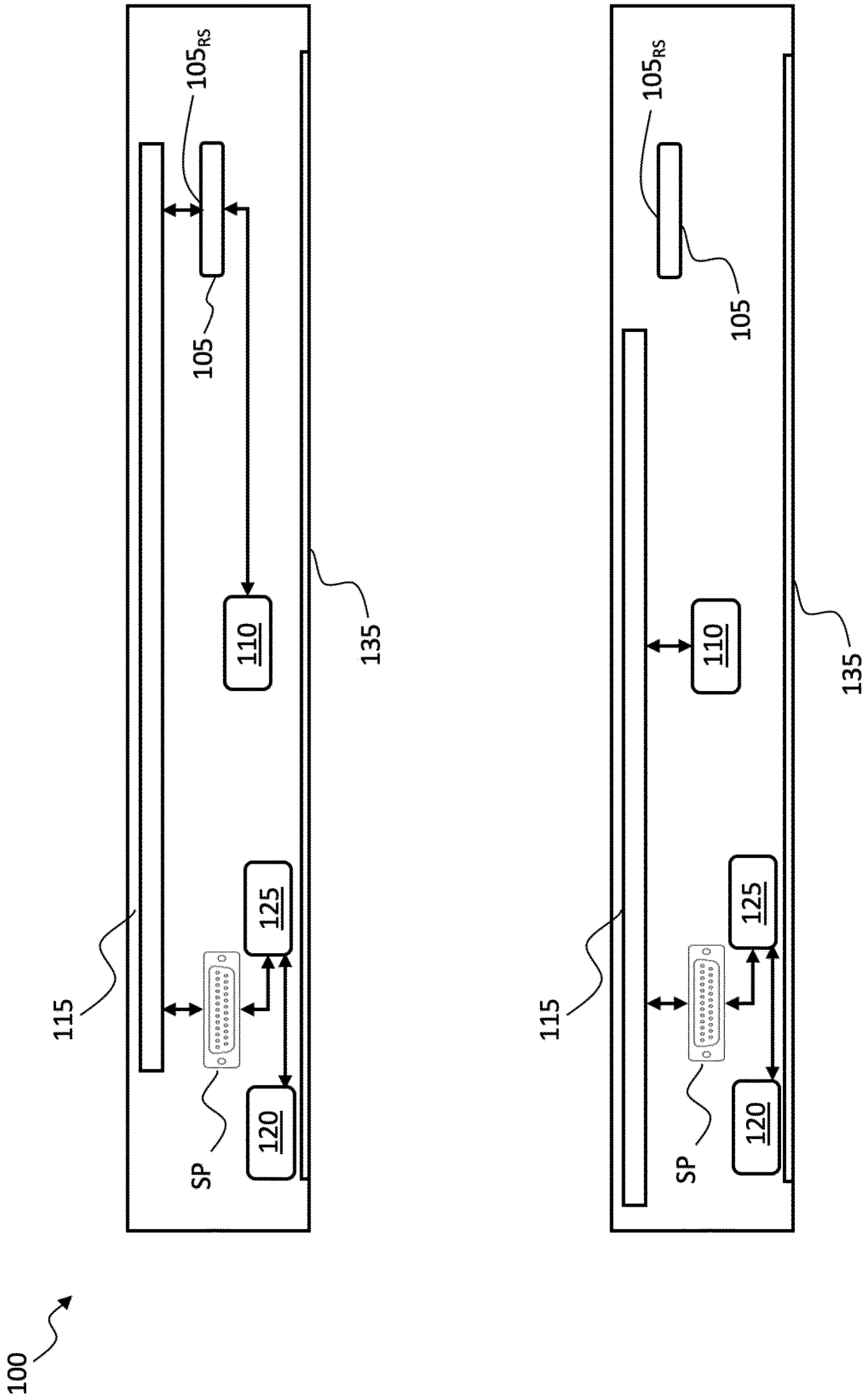
Figure 2:
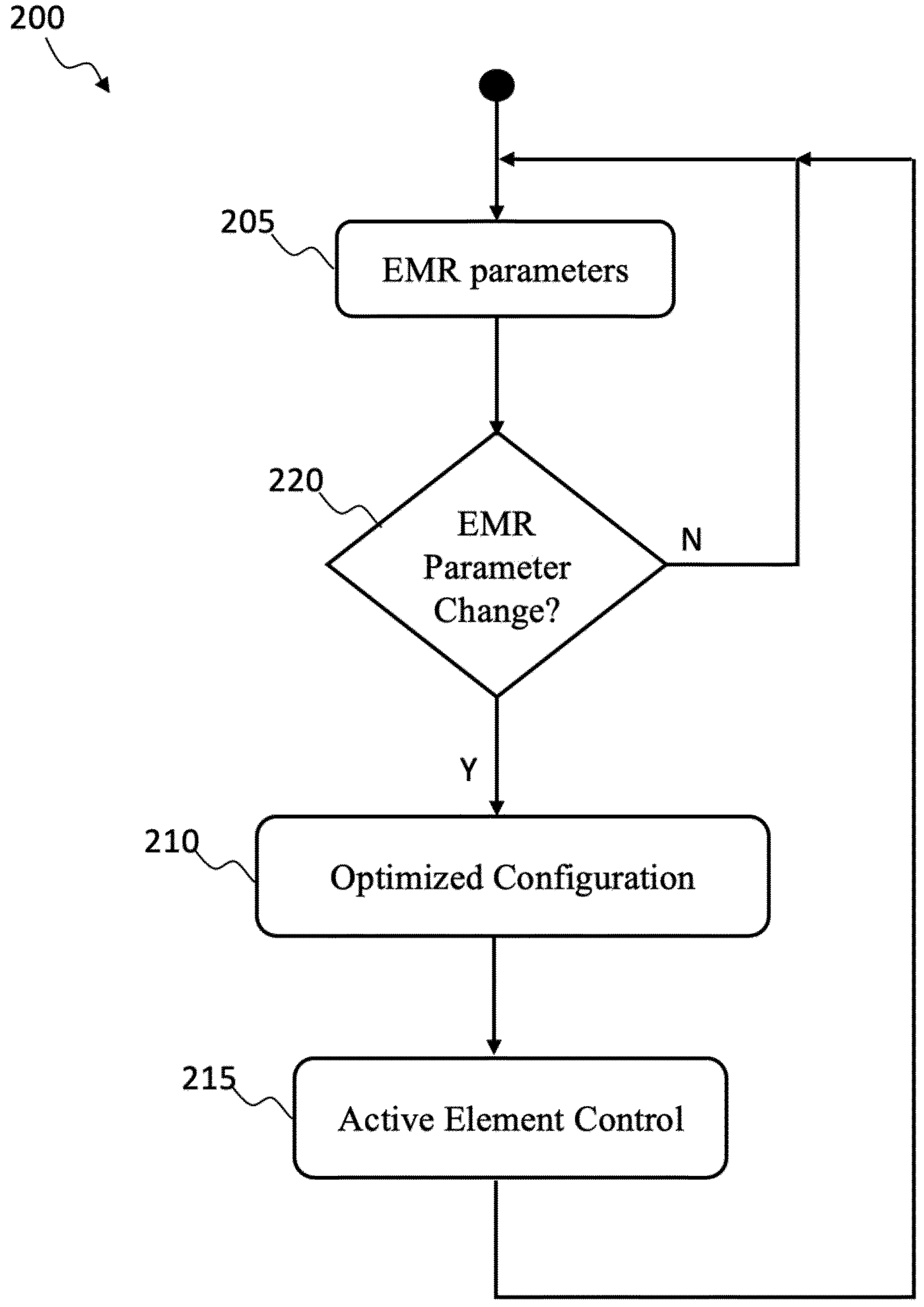

These and other features and advantages of the present invention will be made apparent by the following description of some exemplary and non-limitative embodiments thereof. For its better intelligibility, the following description should be read making reference to the attached drawings, wherein:

FIGS. 1A-1D show an electronic device according to embodiments of the present invention, and FIG. 2 shows an activity diagram of a method according to an embodiment of the present invention.

DETAILED DESCRIPTION OF PREFERRED EMBODIMENTS OF THE INVENTION

FIGS. 1A-1D show an electronic device 100 according to embodiments of the present invention. Particularly, FIG. 1A shows the electronic device 100 in terms of main functional modules, FIG. 1B shows an exemplary implementation of the electronic device 100, and FIGS. 1C and 1D show sectional views, along the sectional axis I-I of FIG. 1B, of the electronic device 100 according to respective embodiments of the present invention. For ease of illustration, only a subset of the main functional modules illustrated in FIG. 1A are shown in FIGS. 1B-1D.

In the following, when one or more features of the electronic device (as well as of components thereof and/or method steps implemented by it) are introduced by the wording "according to an embodiment", they are to be construed as features additional or alternative to any features previously introduced, unless otherwise indicated and/or unless evident incompatibility exists among feature combinations.

In the following, only relevant features of the electronic device 100 that are deemed pertinent for the understanding of the present invention will be discussed, with well-known and/or obvious variants of the relevant features that are omitted for the sake of conciseness.

For the purposes of the present disclosure, the electronic device 100 is adapted to receive, and typically also to transmit, an electromagnetic radiation, such as a radio frequency (RF) signal from a wireless communication system (not shown).

Examples of such an electronic device comprise, but are not limited to, mobile phones, smartphones, tablets, personal digital assistants (PDAs), and laptop computers. In the exemplary implementations of the electronic device 100 shown in FIGS. 1B-1D, the electronic device 100 comprises a smartphone.

However, the principles of the present invention may equivalently apply to any electronic device having connection capabilities with the wireless communication system.

Without losing generality, the wireless communication system may comprise a cellular communication system. The cellular communication system may be based on any suitable radio access technology. Examples of radio access technologies comprise, but are not limited to, UTRA ("UMTS Terrestrial Radio Access"), WCDMA ("Wideband Code Division Multiple Access"), CDMA2000, GERAN ("GSM EDGE Radio Access Network"), LTE ("Long Term Evolution"), LTE-Advanced, and 5G NR ("New Radio").

Without losing generality, the wireless communication system may comprise a WLAN (or Wi-Fi) communication system.

According to an embodiment, the electronic device 100 comprises an antenna arrangement 105. According to an embodiment, the antenna arrangement 105 comprises a transmitting antenna (or more thereof) allowing the electronic device 100 to transmit the electromagnetic radiation (such as the RF signal), and a receiving antenna (or more thereof) allowing the electronic device 100 to receive the electromagnetic radiation (such as the RF signal).

According to an embodiment, the electronic device 100 comprises processing circuitry, such as a RF signal processing circuitry 110. Without losing generality, the RF signal processing circuitry 110 may comprise one or more among RF filters, duplexers, RF/IF front-ends, mixers for frequency down-conversion, A/D converters, and base-band circuits.

According to an embodiment, the antenna arrangement 105 and the RF signal processing circuitry 110 are communicably coupled to each other to allow proper RF signal exchange between the electronic device 100 and the wireless communication system. As conceptually represented in the figure by a dashed line, coupling between the antenna arrangement 105 and the RF signal processing circuitry 110 may also be omitted in embodiments in which transmission/reception functionalities of the antenna arrangement 105 are performed by another entity of the electronic device 100 (such as a metasurface, as discussed in the following); in these embodiments, the antenna arrangement 105 may also be omitted, or it may be at least partially disabled.

According to an embodiment, the electronic device 100 comprises a metasurface 115 configured to intercept the electromagnetic radiation towards the electronic device 100.

By metasurface it is herein meant a two-dimensional (or substantially two-dimensional) metamaterial.

A metamaterial is an artificial material designed to control the electromagnetic radiation impinging on it. The metamaterial is obtained by introducing, in a host material, artificial inclusions, such as passive elements (e.g., metallic or dielectric elements) or active elements (e.g., controllable and/or adjustable and/or programmable electronic components). The artificial inclusions are located at such a mutual distance (typically a fraction of the wavelength) that define a periodic pattern: when the electromagnetic radiation impinges on the metamaterial, inclusion shape, geometry, size, orientation and pattern make the metamaterial capable of manipulating (e.g., blocking, absorbing, enhancing, or bending) the electromagnetic radiation to achieve benefits (e.g., refractive indexes) that are not achievable with conventional materials.

According to an embodiment, the artificial inclusions of the metasurface 115 comprise a plurality of active elements, acting as sensing elements, configured to sense one or more parameters of the electromagnetic radiation (hereinafter, EMR parameters). Examples of EMR parameters comprise, but are not limited to, spectrum, polarization and angle of incidence of the electromagnetic radiation.

As should be understood, the EMR parameters sensed by the artificial inclusions of the metasurface 115 are the EMR parameters of the electromagnetic radiation as it is actually received at the electronic device 100. Indeed, in a real and practical scenario, before being received at the electronic device 100 the electromagnetic radiation may be affected by attenuations and/or reflections depending on environmental conditions (e.g., a morphology of the environment through which the electromagnetic radiation is propagated, such as presence of obstacles and/or weather conditions) and/or on use conditions (such as orientation or position of the electronic device 100, and/or the way the user holds or grasps the electronic device 100 during its use or the place where the user puts back the electronic device 100 after its use): thus, the EMR parameters sensed by the artificial inclusions of the metasurface 115 are affected by actual environmental and/or use conditions experienced by the electromagnetic radiation (actually) received at the electronic device 100.

According to an embodiment, the active elements are controllable active components. According to an embodiment, the active elements are controllable to implement a plurality of configurations of the metasurface 115 each one corresponding to a radiation pattern with which the electromagnetic radiation is allowed to pass through the metasurface 115. Thus, the metasurface 115 is a programmable metasurface being programmable at a selected configuration among the plurality of configurations (the selected configuration being for example an optimized configuration that optimizes electromagnetic radiation reception at the electronic device 100, as better discussed in the following).

Examples of electronic components implementing the active elements comprise, but are not limited to, FET ("Field-Effect Transistor") components, MEMS ("Micro-Electro-Mechanical System") components, varactors and PIN ("Positive-Intrinsic-Negative") diodes.

In a preferred, not limiting embodiment herein considered, the electronic components implementing the active elements of the metasurface 115 comprise an array of PIN diodes (not shown). In this embodiment, a programming of the metasurface 115 may be achieved by switching each PIN diode (or each set of PIN diodes) between "on" and "off" states (corresponding to logic levels "1" and "0", respectively) corresponding to an impedance matching (perfect absorption) or impedance mismatching (total reflection) between the impedance of the active elements (and, hence, of the metasurface 115 as a whole) and the impedance of the free space through which the electromagnetic radiation is propagated (i.e., the space surrounding the electronic device 100). Just as an example, if each active element comprises two PIN diodes, then four logic levels ("00", "01", "10", and "11") are possible, each one corresponding to a different reflection phase (e.g., 0°, 90°, 180°, and 270°).

According to an embodiment, the metasurface 115 is a space-time coding metasurface, i.e. a metasurface whose active elements are controlled to enable precise manipulation of the electromagnetic radiation in both space and frequency domains. According to space-time coding principles, the reflection coefficient of the metasurface is dynamically controlled with discrete phase or amplitude states by applying control voltages to the active elements (such as the PIN diodes). Just as an example, the reflection phase of each active element may be periodically switched according to the digital "0/1" space-time-coding matrix, which can result in an equivalent multi-bit space-coding.

An example of space-time coding metasurface can be found in Zhang et al., "Space-time-coding digital metasurfaces", Nature Communications, 9, 4334 (2018) (DOI: 10.1038/s41467-018-06802-0) which is incorporated herein by reference.

According to an embodiment, the metasurface 115 is applied on or at a case of the electronic device 100 (hereinafter, device case) that encloses one or more electronic components of the electronic device (such as the antenna arrangement 105, the RF signal processing circuitry 110 and one or more among a processing unit, a control unit, FPGA circuitry, a storage unit, an input/output unit, and a wireless interface, which are discussed in the following).

According to an embodiment, the metasurface 115 is applied on or at a face of the device case that does not affect (or significantly affect) usability of the electronic device 100 and/or a layout of the electronic components of the electronic device 100. In the exemplary considered embodiment in which the electronic device 100 comprises a smartphone, the metasurface 115 may be applied on or at a back face of the smartphone case opposite to a front face thereof (that typically comprises an input/output unit, such as a display), as visible in FIG. 1B.

According to an embodiment, the metasurface 115 is external to the device case, as visible in FIG. 1C.

According to an embodiment, the metasurface 115 is internal to the device case, as visible in FIG. 1D.

In the exemplary considered embodiment in which the electronic device 100 comprises a smartphone, the metasurface 115 may be applied on an external back face of the smartphone case (FIG. 1C), or the metasurface 115 may be applied at an inner back face of the smartphone case opposite to the external face thereof (FIG. 1D).

According to an embodiment, the metasurface 115 is communicably coupled to the antenna arrangement 105; in this embodiment, the optimized configuration at which the metasurface 115 is programmed allows optimizing electromagnetic radiation reception at the antenna arrangement 105 through the metasurface 115. Otherwise stated, in this embodiment (hereinafter referred to as lens embodiment), the metasurface 115 acts as a lens directing or focusing the electromagnetic radiation towards the antenna arrangement 105.

According to an alternative embodiment, the metasurface 115 is communicably coupled to the RF signal processing circuitry 110; in this embodiment, the optimized configuration at which the metasurface 115 is programmed allows optimizing electromagnetic radiation reception at the electronic device 100 through the metasurface 115, the metasurface 115 thus acting as an antenna of the electronic device 100. Otherwise stated, in this embodiment (hereinafter referred to as antenna embodiment), the metasurface 115 acts as an antenna in place of the antenna arrangement 105. In a first practical implementation of the antenna embodiment, regardless of whether the metasurface 115 is external or internal to the device case, no antenna arrangement 105 may be provided in the electronic device 100 (in that such an antenna arrangement 105, if provided, would be bypassed by the metasurface 115, and hence it would be unused). In a second practical implementation of the antenna embodiment, regardless of whether the metasurface 115 is external or internal to the device case, the antenna arrangement 105 may still be provided in the electronic device 100. In this second practical implementation, the metasurface 115 bypasses the antenna arrangement 105 and acts as an antenna of the electronic device 100 in place of the antenna arrangement 105. Just as an example, this could be the case of an electronic device 100 in which removal of the antenna arrangement 105 would result in a disadvantageous redesign. Just as another example, this could be the case of functionalities in which operation of the antenna arrangement 105 or of the metasurface 115 acting as an antenna in place of the antenna arrangement 105 may be selectively activated depending on one or more parameters/conditions of use of the electronic device 100 and/or on one or more parameters/propagation conditions of the electromagnetic radiation.

These alternative embodiments are conceptually represented in FIG. 1A by a dashed line between the metasurface 115 and the antenna arrangement 105 (lens embodiment) and by a dashed line between the metasurface 115 and the RF signal processing circuitry 110 (antenna embodiment).

In the lens embodiment, regardless of whether the metasurface 115 is external or internal to the device case, the metasurface 115 may advantageously take, with respect to the antenna arrangement 105, a position in which the metasurface 115 at least partially overlaps the antenna arrangement 105 (top drawings of FIGS. 1C and 1D), so that the electromagnetic radiation intercepted by the metasurface 115 is optimally directed or focused towards the antenna arrangement 105.

In the lens embodiment, regardless of whether the metasurface 115 is external or internal to the device case, the metasurface 115 may advantageously take, with respect to the antenna arrangement 105, a position in which the metasurface 115 at least partially overlaps a reception surface $\mathbf{105}_{RS}$ of the antenna arrangement 105 (i.e., a surface of the antenna arrangement 105 designed to receive the electromagnetic radiation or the relevant part thereof) (top drawings of FIGS. 1C and 1D).

In the antenna embodiment, regardless of whether the metasurface 115 is external or internal to the device case, the metasurface 115 may advantageously take, with respect to the antenna arrangement 105, a position in which the metasurface 115 does not overlap the antenna arrangement 105 (bottom drawings of FIGS. 1C and 1D), so that the electromagnetic radiation intercepted by the metasurface 115 is optimally directed or focused towards RF signal processing circuitry 110.

In the antenna embodiment, regardless of whether the metasurface 115 is external or internal to the device case, the metasurface 115 may advantageously take, with respect to the antenna arrangement 105, a position in which the metasurface 115 does not overlap the reception surface $\mathbf{105}_{RS}$ of the antenna arrangement 105 (bottom drawings of FIGS. 1C and 1D).

According to an embodiment, the electronic device 100 comprises a control unit CU.

According to an embodiment, the control unit CU is communicably coupled to metasurface 115. According to an embodiment, the control unit CU is communicably coupled to metasurface 115 for receiving the EMR parameters of the electromagnetic radiation from the metasurface 115 (and for accordingly controlling the active elements of the metasurface 115, as discussed in the following).

According to an embodiment, the control unit CU comprises a processing unit 120, such as a central processing unit, configured to execute program instructions for controlling an overall operation of the electronic device 100.

For the purposes of the present disclosure, the processing unit 120 is further configured to identify, based on the EMR parameters of the electromagnetic radiation, an optimized configuration, among the plurality of configurations, that optimizes electromagnetic radiation reception at the electronic device 100.

According to an embodiment, the control unit CU comprises a FPGA ("Field-Programmable Gate Array") circuitry 125 (or other programmabale hardware circuit, such as an ASIC ("Application Specific Integrated Circuit") circuitry) for controlling each active element of the metasurface 115.

According to an embodiment, the FPGA circuitry 125 is programmable according to the optimized configuration.

According to an embodiment, the FPGA circuitry 125 is programmable to translate or convert a coding pattern corresponding to the optimized configuration (hereinafter, optimized coding pattern) into respective control voltages (or control signals), and to apply the control voltages corresponding to the optimized coding pattern to the active elements (such as the PIN diodes) of the metasurface 115.

According to an embodiment, the FPGA circuitry 125 is communicably coupled to the metasurface 115 through a respective serial port SP (shown in FIG. 1D).

According to an embodiment, the serial port SP communicably coupling the metasurface 115 and the FPGA circuitry 125 to each other may be configured to provide a power supply to the metasurface 115.

According to an embodiment, the FPGA circuitry 125 may also be configured to receive the EMR parameters from the metasurface 115 (as conceptually represented in FIG. 1A by a bidirectional arrow between the FPGA circuitry 125 and the metasurface 115, and in FIG. 1D by bidirectional arrows between the metasurface 115 and the serial port SP and between the serial port SP and the FPGA circuitry 125).

According to an embodiment, provision of the serial port SP communicably coupling the metasurface 115 and the FPGA circuitry 125 to each other may be advantageous (although not exclusive) when the metasurface 115 is internal to the device case, as visible in FIG. 1D.

According to an embodiment, the processing unit 120 is communicably coupled to the FPGA circuitry 125 for providing to the FPGA circuitry 125 the optimized configuration. In addition, according to an embodiment, the processing unit 120 is communicably coupled to the FPGA circuitry 125 for receiving the EMR parameters therefrom (as conceptually represented in the figures by bidirectional arrows between the processing unit 120 and the FPGA circuitry 125).

As conceptually represented in FIG. 1A by dashed lines, coupling between the metasurface 115, the processing unit 120 and the FPGA circuitry 125 may also be omitted or provided for other purposes. This could be the case, for example, of embodiments in which reception of the EMR parameters from the metasurface 115 and control of the active elements of the metasurface 115 through the control voltages is performed by means of a proper wireless interface (such as a Bluetooth™ interface, as discussed in the following).

According to an embodiment, reception of the EMR parameters from the metasurface 115 and control of the active elements of the metasurface 115 through the control voltages performed by means of a proper wireless interface (such as a Bluetooth interface) is advantageous (although not exclusive) when the metasurface 115 is external to the device case, as visible in FIG. 1C (in which both the serial port and the FPGA circuitry are exemplarily not provided). Although not shown, embodiments may be provided in which the metasurface 115 is internal to the device case, and reception of the EMR parameters from the metasurface 115 and control of the active elements of the metasurface 115 through the control voltages is performed by means of a proper wireless interface (such as a Bluetooth interface).

According to an embodiment, the control unit CU comprises the RF signal processing circuitry 110.

According to an embodiment, the electronic device 100 comprises a storage unit 130. According to an embodiment, the storage unit 130 may comprise a RAM ("Random Access Memory") memory and/or a ROM ("Read Only Memory") memory.

According to an embodiment, the storage unit 130 may be configured to store a configuration database comprising a plurality of optimized configurations as a function of the EMR parameters. According to an embodiment, the configuration database comprises a plurality of optimized coding patterns each one corresponding to a respective optimized configuration.

According to an embodiment, the plurality of optimized configurations may be pre-calculated based on procedures conventionally adopted for designing phased array antennas and TMA ("Time Modulated Array") antennas (as disclosed, for example, in the above referenced work by Zhang et al., "Space-time-coding digital metasurfaces").

According to an embodiment, the storage unit 130 and the processing unit 120 are communicably coupled to each other, whereby the processing unit 120 is configured to retrieve the optimized configuration (e.g., the optimized coding pattern) from the configuration database based on the EMR parameters determined at the metasurface 115.

According to an embodiment, the control unit CU comprises the storage unit 130.

According to alternative embodiments, discussed in the following, the processing unit 120 is configured to determine the optimized configuration based on an artificial intelligence algorithm (the artificial intelligence algorithm being for example implemented in the processing unit 120 or in another unit of the electronic device 100); in these embodiments, the configuration database may also be omitted, and the storage unit 130 may be provided for other purposes.

According to an embodiment, the electronic device 100 comprises an input/output unit 135 (for example, a keyboard and/or a screen and/or touchscreen and/or display). The input/output unit 135 may for example be used to generate and/or receive and/or display messages.

According to an embodiment, the electronic device 100 comprises a power supply unit (for example, a battery) 140 for powering the electronic device 100.

According to an embodiment, the electronic device 100 comprises a wireless interface, such as a Bluetooth interface 145. According to an embodiment, the Bluetooth interface 145 is communicably coupled to the processing unit 120 for exchange of data transmitted/received over Bluetooth signals. As mentioned above, reception of the EMR parameters from the metasurface 115 and control of the active elements of the metasurface 115 through the control voltages performed by means of the Bluetooth interface is advantageous (although not exclusive) when the metasurface 115 is external to the device case, as visible in FIG. 1C.

According to an embodiment, the Bluetooth interface 145 may be communicably coupled to the metasurface 115 for receiving the EMR parameters therefrom and for providing the control voltages thereto. In this embodiment, the serial port may also be omitted (or it may be provided for other purposes), and another entity of the electronic device 100 other than the serial port (such as a USB module, discussed in the following) may provide the power supply to the metasurface 115.

As conceptually represented in FIG. 1A by a dashed line between the metasurface 115 and the Bluetooth interface 145, coupling between the metasurface 115 and the Bluetooth interface 145 may also be omitted in embodiments in which reception of the EMR parameters from the metasurface 115 and control of the (active elements of the) metasurface 115 through the control voltages is performed by means of the FPGA circuitry 125 (as discussed above).

According to an embodiment, the electronic device 100 is configured to implement a method for optimizing electromagnetic radiation reception at the electronic device 100. An activity diagram of such a method according to an embodiment of the present invention is shown in FIG. 2 and denoted by the number reference 200.

According to an embodiment, the method 200 comprises sensing the EMR parameters (action node 205).

As mentioned above, the EMR parameters are sensed by the active elements of the metasurface 115. According to an embodiment, the EMR parameters are sensed by a subset of the active elements of the metasurface 115. According to an embodiment, the subset of the active elements of the metasurface 115 configured to sense the EMR parameters depends on a position of the metasurface 115, for example a position of the metasurface 115 with respect to the antenna arrangement 105.

According to an embodiment, the method 200 comprises determining the optimized configuration (action node 210).

As mentioned above, the optimized configuration may be determined based on the configuration database stored in the storage unit 130. According to an embodiment, the optimized configuration is determined at the processing unit 120 based on the plurality of optimized configurations stored in the storage unit 130 as a function of the EMR parameters. According to an embodiment, the optimized configuration is determined at the processing unit 120 as the configuration, among the plurality of (optimized) configurations, whose EMR parameters correspond (or better approach or approximate) the EMR parameters detected by the active elements at the action node 205. Therefore, in this embodiment, the processing unit 120 may be configured to compare the EMR parameters detected by the active elements at the action node 205 with the EMR parameters associated with the plurality of configurations stored in the configuration database, and to determine the optimized configuration as the configuration, among the plurality of configurations, whose EMR parameters correspond (or better approach or approximate) the sensed EMR parameters.

As mentioned above, according to an alternative embodiment, the optimized configuration may be determined based on an artificial intelligence algorithm. According to an embodiment, the artificial intelligence algorithm may be implemented in the processing unit 120. According to an embodiment, not shown, the artificial intelligence algorithm may be implemented in a dedicated unit internal to the electronic device 100 or external thereto (the dedicated unit being for example implemented in one or more entities of the wireless communication network).

According to an embodiment, the optimized configuration may be determined based on deep-learning architectures, such as deep convolutional neural networks. According to an embodiment, deep-learning architectures may be used offline for training the artificial intelligence algorithm, e.g. based on data collected from tests and simulations.

According to an embodiment, the method 200 comprises controlling the active elements of the metasurface 115 according to the optimized configuration (action node 215).

As mentioned above, this may be achieved by causing the processing unit 120 to provide the optimized configuration to the FPGA circuitry 125, and by causing the FPGA circuitry 125 to transmit to the metasurface 115 the control voltages corresponding to the optimized configuration, or by causing the processing unit 120 to determine the control voltages corresponding to the optimized configuration and to transmit the control voltages to the metasurface 115 by means of a proper wireless interface, such as the Bluetooth interface 145.

According to an embodiment, EMR parameter sensing performed at action node 205 takes place in a continuous way or in a discrete way (i.e., at predetermined time intervals).

As conceptually represented in the figure by loop connection between action nodes 215 and 205, according to an embodiment, nodes 205 to 215 are iteratively performed at each EMR parameter sensing. This allows controlling the active elements of the metasurface 115 according to the optimized configuration corresponding to the actual environmental and/or use conditions experienced by the electromagnetic radiation received at the electronic device 100. Thus, the electronic device 100 features maximized reception of the electromagnetic radiation (such as RF signals) in almost every condition, e.g. independently from the dynamic (i.e., frequent and random, and hence unpredictable) way a user holds the electronic device 100 and/or from the environmental conditions (which are inherently unpredictable, especially when the user is moving at a relatively high speed). The electronic device 100 is therefore insensitive with respect to changes in the antenna inclination angles resulting from frequent and random movements/rotations of the electronic device 100, and with respect to environmental conditions. Thus, in response to sudden attenuations and/or reflections due to unexpected changes in environmental and/or use conditions, the electronic device 100 features dynamically and real-time maximized reception of the electromagnetic radiation at the electronic device 100 even in these changed environmental and/or use conditions.

Moreover, the same configuration of the metasurface that leads to an improved and/or maximized reception of the electromagnetic radiation may also advantageously serve to maximize transmission efficiency of the electronic device 100, particularly if the electronic device 100 is connected to a wireless communication system through a single antenna (or a single antenna system) of the wireless communication system that acts both in reception and in transmission, and/or where the same antennas (or antenna systems) of the wireless communication system serve the electronic device 100 both in reception and in transmission.

According to an embodiment, the method 200 comprises, after sensing the EMR parameters at action node 205, checking whether the sensed EMR parameters at least partially differ (in values) from the EMR parameters corresponding to the optimized configuration currently in use (decision node 220).

In the negative case (exit branch N of the decision node 220), which means that the sensed EMR parameters are the same (i.e., they have same values) as the EMR parameters corresponding to the optimized configuration at which the metasurface 115 is currently programmed, EMR parameter sensing is performed again (action node 205). In other words, EMR parameter sensing is performed as long as no change in the (values of) EMR parameters is detected (as conceptually illustrated in the figure by loop connection between exit branch N of the decision node 220 and action node 205).

In the affirmative case (exit branch Y of the decision node 220), which means that the sensed EMR parameters at least partially differ from the EMR parameters corresponding to the optimized configuration at which the metasurface 115 is currently programmed, the optimized configuration corresponding to the sensed EMR parameter is determined (action node 210) and control of the active elements of the metasurface 115 according to the optimized configuration is performed (action node 215) as discussed above.

Checking the sensed EMR parameters with respect to the EMR parameters corresponding to the optimized configuration currently in use (decision node 220) allows avoiding unnecessary computations (in that operations of action nodes 210 and 215 are performed only when a change in the EMR parameters is sensed).

Furthermore, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

For example, the electronic device may have a different structure or include equivalent components. Moreover, any component of the electronic device may be separated into several elements, or two or more components may be combined into a single element; furthermore, each component can be replicated to support the execution of the corresponding operations in parallel. It should also be noted that (unless otherwise indicated) any interaction between different components generally does not need to be continuous, and may be either direct or indirect through one or more intermediaries.

In addition, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. An electronic device adapted to receive and process an electromagnetic radiation, such as a radio frequency signal from a wireless communication system, the electronic device comprising:

a metasurface for intercepting the electromagnetic radiation, the metasurface comprising a plurality of active elements for sensing at least one parameter of the electromagnetic radiation as it is actually received at the electronic device, wherein the active elements of said plurality of active elements are controllable to implement a plurality of configurations of the metasurface each one corresponding to a radiation pattern with which the electromagnetic radiation is passed through the metasurface, and processing circuitry communicably coupled to the metasurface, wherein the processing circuitry is configured to iteratively:

receive the sensed at least one parameter from the metasurface;

identify, based on the at least one parameter of the electromagnetic radiation, an optimized configuration, among the plurality of configurations, that optimizes electromagnetic radiation reception at the electronic device, and control the active elements to implement the optimized configuration, wherein the metasurface acts as an antenna of the electronic device and wherein the optimized configuration implemented by the active elements allows optimizing electromagnetic radiation reception at the electronic device through the metasurface, wherein the processing circuitry is configured to control the active elements according to space-time coding, whereby the metasurface is configured to manipulate the electromagnetic radiation in both space and frequency domains by the processing circuitry controlling a reflection coefficient of the metasurface with discrete phase or amplitude states by applying control voltages to the active elements.

2. The electronic device according to claim 1, wherein the processing circuitry is configured to identify the optimized configuration based on:

a predefined configuration database comprising a plurality of optimized configurations as a function of the at least one parameter, or an artificial intelligence algorithm.

3. The electronic device according to claim 1, further comprising an antenna arrangement allowing the electronic device to receive the electromagnetic radiation, wherein the optimized configuration implemented by the active elements allows optimizing electromagnetic radiation reception at the antenna arrangement through the metasurface.

4. The electronic device according to claim 3, wherein the metasurface at least partially overlaps a reception surface of the antenna arrangement designed to receive the electromagnetic radiation.

5. The electronic device according to claim 1, wherein the metasurface is external or internal to a case of the electronic device.

6. The electronic device according to claim 1, wherein the processing circuitry comprises a Field-Programmable Gate Array unit, being programmable according to the optimized configuration.

7. The electronic device according to claim 1, wherein the at least one parameter of the electromagnetic radiation comprises at least one among spectrum, polarization and angle of incidence of the electromagnetic radiation.

8. The electronic device according to claim 1, wherein the active elements comprise one or more among field-effect transistors, micro-electro-mechanical systems, varactors and positive-intrinsic-negative (PIN) diodes.

9. A method for operating an electronic device adapted to receive and process an electromagnetic radiation, such as a radio frequency signal from a wireless communication system, wherein the electronic device comprises a metasurface for intercepting the electromagnetic radiation, the metasurface comprising a plurality of active elements for sensing at least one parameter of the electromagnetic radiation as it is actually received at the electronic device, and wherein the active elements of said plurality of active elements are controllable to implement a plurality of configurations of the metasurface each one corresponding to a radiation pattern with which the electromagnetic radiation is passed through the metasurface, the method comprising iteratively:

receiving the sensed at least one parameter from the metasurface;

identifying, based on the at least one parameter of the electromagnetic radiation, an optimized configuration, among the plurality of configurations, that optimizes electromagnetic radiation reception at the electronic device, and controlling the active elements to implement the optimized configuration, wherein the metasurface acts as an antenna of the electronic device and wherein the optimized configuration implemented by the active elements allows optimizing electromagnetic radiation reception at the electronic device through the metasurface, wherein the method further includes controlling the active elements according to space-time coding, whereby the metasurface is configured to manipulate the electromagnetic radiation in both space and frequency domains by controlling a reflection coefficient of the metasurface with discrete phase or amplitude states by applying control voltages to the active elements.

10. The electronic device according to claim 8, wherein the active elements comprise the field-effect transistors.

11. The electronic device according to claim 8, wherein the active elements comprise the micro-electro-mechanical systems.

12. The electronic device according to claim 8, wherein the active elements comprise the varactors and the PIN diodes.

13. The electronic device according to claim 12, wherein a programming of the metasurface includes switching each PIN diode between on and off states corresponding to an impedance matching or impedance mismatching between an impedance of the active elements and an impedance of a free space through which a electromagnetic radiation is propagated.

* * * * *